July 31, 1923.
G. E. CUSTER
PEDAL LOCK
Filed Feb. 21, 1921
1,463,676
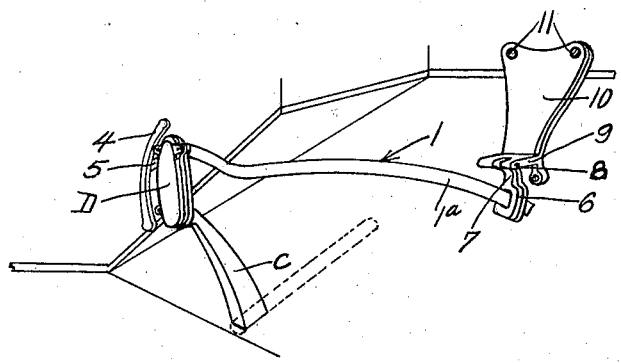
FIG. 1.
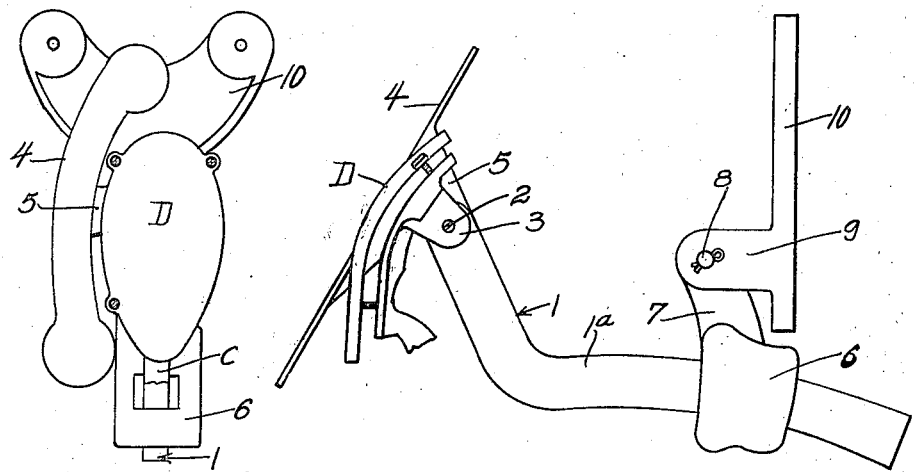
FIG. 3.
FIG. 2.
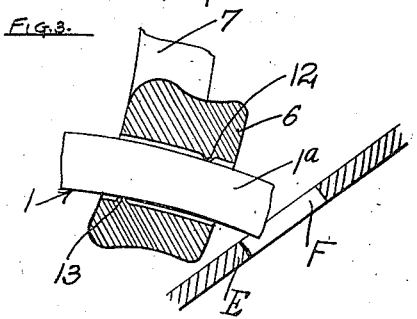
FIG. 4.
George E. Custer, INVENTOR
BY Victor J. Evans ATTORNEY Patented July 31, 1923.

1,463,676

UNITED STATES PATENT OFFICE.

GEORGE E. CUSTER, OF STOYESTOWN, PENNSYLVANIA, ASSIGNOR TO CUSTER MANUFACTURING COMPANY, OF STOYESTOWN, PENNSYLVANIA, A CORPORATION OF PENNSYLVANIA.

PEDAL LOCK.

Application filed February 21, 1921. Serial No. 446,631.

*To all whom it may concern:*

Be it known that I, GEORGE E. CUSTER, a citizen of the United States, residing at Stoyestown, in the county of Somerset and State of Pennsylvania, have invented new and useful Improvements in Pedal Locks, of which the following is a specification.

This invention relates to locking means, and more particularly to means for locking the clutch lever of an automobile in low speed position.

One of the main objects of the invention is to provide a simple and efficient locking means for the purpose stated which may be readily applied to the clutch control lever without necessitating any material changes in the same. A further object is to provide a locking device which may be readily controlled by the operator's foot with which the clutch control lever is operated. Further objects will appear from the detailed description.

In the drawings:

Figure 1 is a side perspective view of a device constructed in accordance with my invention as applied.

Figure 2 is a side view of the device.

Figure 3 is a front view, the clutch lever being broken away.

Figure 4 is a section through the locking collar.

Clutch lever C is provided at its upper end with the usual pedal D by means of which this lever is operated in the known manner. A locking bar 1 is pivoted at 2 to a lug 3 extending from the forward portion of pedal D. A foot plate 4 is rigidly connected by an arm 5 to the locking arm 1. The forward portion 1ª of arm 1 is of arcuate shape and is slidable through a collar 6 carried by a link 7 which is pivoted at 8 in a bracket 9 projecting from a base plate 10 which may be secured by screws 11, or in any other suitable manner, to the dash of the automobile, collar 6 normally resting upon foot board E which is provided with a slot F to accommodate bar 1.

When sleeve 6 is in normal position bar 1 is freely slidable through the same. This sleeve is provided on its upper wall with an inwardly projecting and transversely extending rib 12, a similar rib 13 being provided adjacent to the rearward edge of the lower wall of the sleeve. These ribs are so related that when bar 1 is raised into contact with rib 12 and is then permitted to move rearwardly, sleeve 6 will be rocked upwardly and rearwardly so as to bring rib 13 into contact with the lower face of the bar. When this occurs, continued rearward pressure or pull on bar 1 exerted by lever C serves to bind the bar in sleeve 6 thus effectively locking it against rearward movement and holding lever C in low speed position. This upward movement of bar 1 may be accomplished by pressing on the lower portion of plate 4, this action occurring simultaneously with movement of lever C into low speed position. To release bar 1 pressure is exerted on the upper portion of plate 4 thus rocking the forward portion 1ª of the bar downwardly and out of contact with ribs 12 and 13. This permits sleeve 6 to drop to its normal position on foot board E so that the locking bar can slide freely through the sleeve in either direction desired. This permits operation of lever C at the will of the driver since the locking device is not put into operation except when locking bar 1 is rocked through the medium of plate 4.

This device has been thoroughly tested out and found very efficient and practical in use. While I have found the particular construction disclosed herein to be very practical, it may be found desirable to resort to changes in details of construction and arrangement of parts of the invention without departing from the field and scope of the same, and I intend to include all such variations, as fall within the scope of the appended claims, in this application in which a preferred form only of my invention is disclosed.

What I claim is:

1. In combination with a clutch lever, a member mounted for free swinging movement, a locking bar slidable through said member, the member being normally positioned to permit free sliding movement therethrough of said bar, connections between the bar and said lever, and means for moving the bar into and out of operative relation to said member.

2. In combination with a clutch lever, a collar mounted for free swinging movement and having its movement in one direction limited, a locking bar slidable through said collar and connected to the lever, and means for moving said bar into and out of contact with the collar adjacent to one edge thereof.

3. In combination with a clutch lever, a collar mounted for free swinging movement toward the lever and having its movement away from the lever limited, a locking bar connected to said lever and slidable through said collar, and means for moving said bar toward or away from one edge of the collar.

4. In combination with a clutch lever, a sleeve suspended for swinging movement toward and away from the lever, and a locking bar slidable through the sleeve and pivoted to the lever, the movement of the sleeve in one direction being limited.

5. In combination with a clutch lever, a sleeve suspended in advance of the lever and from its top wall for swinging movement toward and away from said lever, movement of said sleeve away from the lever being limited, and a locking bar pivoted to the lever and slidable through said sleeve.

6. In combination with a clutch lever, a link in advance of said lever and pivoted at its upper end for movement toward and away from the lever, a sleeve carried by said link at the lower end thereof, means for limiting movement of the sleeve away from the lever, and a locking bar pivoted to the lever and normally slidable through said sleeve.

7. In combination with a clutch lever, a sleeve suspended from its top wall for swinging movement toward and away from said lever, said sleeve being provided on the inner faces of its top and bottom walls with transversely extending ribs, the rib on the top wall being adjacent to the forward end thereof and the rib on the bottom wall being adjacent to the rearward end thereof, means for limiting movement of the sleeve away from the lever, and a bar pivoted to the lever and normally slidable through said sleeve.

8. In combination with a clutch lever provided at its upper end with a pedal, a sleeve in advance of the lever and suspended from its top wall for swinging movement on a horizontal axis, means for limiting movement of the sleeve away from the lever, a bar pivoted to the pedal for movement of a horizontal axis and slidable through the sleeve, and a foot plate extending about one side of and adjacent to said pedal, said plate being rigidly secured to the forward end of the bar.

In testimony whereof I affix my signature.

GEORGE E. CUSTER.